United States Patent
Moro et al.

(10) Patent No.: US 10,350,990 B2
(45) Date of Patent: Jul. 16, 2019

(54) SHUTTER GRILL DEVICE

(71) Applicant: HONDA MOTOR CO., LTD., Tokyo (JP)

(72) Inventors: Kosuke Moro, Wako (JP); Shinichi Kitajima, Wako (JP); Naoaki Takebe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/962,129

(22) Filed: Apr. 25, 2018

(65) Prior Publication Data

US 2018/0312053 A1 Nov. 1, 2018

(30) Foreign Application Priority Data

Apr. 26, 2017 (JP) ................. 2017-087602

(51) Int. Cl.

| | |
|---|---|
| B60K 11/00 | (2006.01) |
| B60K 11/08 | (2006.01) |
| B60K 11/06 | (2006.01) |
| F01P 7/12 | (2006.01) |
| F01P 11/10 | (2006.01) |
| B60K 11/04 | (2006.01) |
| F01P 7/10 | (2006.01) |
| F01P 1/06 | (2006.01) |

(52) U.S. Cl.
CPC ............ B60K 11/085 (2013.01); B60K 11/04 (2013.01); B60K 11/06 (2013.01); F01P 7/10 (2013.01); F01P 7/12 (2013.01); F01P 11/10 (2013.01); F01P 1/06 (2013.01); Y02T 10/88 (2013.01)

(58) Field of Classification Search
CPC ........ B60K 11/00; B60K 11/08; B60K 11/085
See application file for complete search history.

(56) References Cited

U.S. PATENT DOCUMENTS

| | | | |
|---|---|---|---|
| 6,354,096 B1 * | 3/2002 | Siler ................. | F01P 7/048 236/35.3 |
| 2011/0288717 A1 * | 11/2011 | Yu ................... | B60K 11/085 701/31.4 |
| 2017/0361698 A1 * | 12/2017 | Hussain .......... | B60K 11/02 |

FOREIGN PATENT DOCUMENTS

| | | |
|---|---|---|
| JP | 2010-069898 A | 4/2010 |
| JP | 2014-080072 A | 5/2014 |
| JP | 2016-117412 A | 6/2016 |

OTHER PUBLICATIONS

Japanese Office Action dated Oct. 30, 2018, 4 pages.

* cited by examiner

*Primary Examiner* — James A Shriver, II
*Assistant Examiner* — James J Triggs
(74) *Attorney, Agent, or Firm* — Rankin, Hill & Clark LLP (57) ABSTRACT

A cooling system includes: a shutter grille provided to an air guide port configured to guide air to a power compartment in which a power source of a vehicle is installed; a radiator configured to radiate heat from coolant for cooling the power source; a radiator fan configured to send the air to the radiator and the power source; a shutter grille controller configured to control opening and closing of the shutter grille; and a radiator fan controller configured to control the radiator fan. If a power source load on the power source is less than predetermined power source load, and if an air conditioning load on an air conditioner is equal to or greater than predetermined air conditioning load, the shutter grille controller and the radiator fan controller operate the radiator fan with the shutter grille closed.

5 Claims, 8 Drawing Sheets

SHUTTER GRILL DEVICE

BACKGROUND OF THE INVENTION

1. Field of the Invention

The present invention relates to a shutter grille system for a vehicle.

2. Description of the Related Art

A system has been known which is capable of controlling a flow rate of air flowing into an engine compartment based on opening and closing operation of a shutter mechanism provided to a grille opening portion in a vehicle body front part of a vehicle (see Japanese Patent Application Publication No. 2014-80072). The vehicle using such a system performs a control to open the shutter in a case where the engine temperature or the air conditioning coolant pressure rises while the air conditioner system is in use.

SUMMARY OF THE INVENTION

In the case where, however, the shutter is opened based on a condition for the air conditioning coolant pressure, there is likelihood that the opening may cause the engine to be cooled although the engine temperature does not rise, and hinder desirable aerodynamic performance.

The present invention has been made to solve the above problems and has an object to provide a cooling system which is capable of fulfilling all of the cooling performance, the aerodynamic performance and the warming performance.

To solve the above problems, a cooling system according to the present invention is characterized by including: a shutter grille provided to an air guide port configured to guide air to a power compartment in which a power source of a vehicle is installed; a radiator configured to radiate heat from coolant for cooling the power source; a radiator fan configured to send the air to the radiator and the power source; a shutter grille controller configured to control opening and closing of the shutter grille; and a radiator fan controller configured to control the radiator fan. The cooling system is characterized in that, if a power source load on the power source is less than predetermined power source load, and if an air conditioning load on an air conditioner is equal to or greater than predetermined air conditioning load, the shutter grille controller and the radiator fan controller operate the radiator fan with the shutter grille closed.

According to the present invention, it is possible to achieve cooling performance, aerodynamic performance and heating performance in a vehicle at the same time.

DETAILED DESCRIPTION OF THE EMBODIMENTS

Embodiments of the present invention will be hereinafter described in detail with reference to the accompanying drawings depending on the necessity. Incidentally, "front" and "rear" pointed by arrows in FIG. 1 indicate frontward and rearward directions of a vehicle, while "left" and "right" pointed by the other arrows indicate leftward and rightward directions (a vehicle width direction) from the driver's seat.

Figure 1:
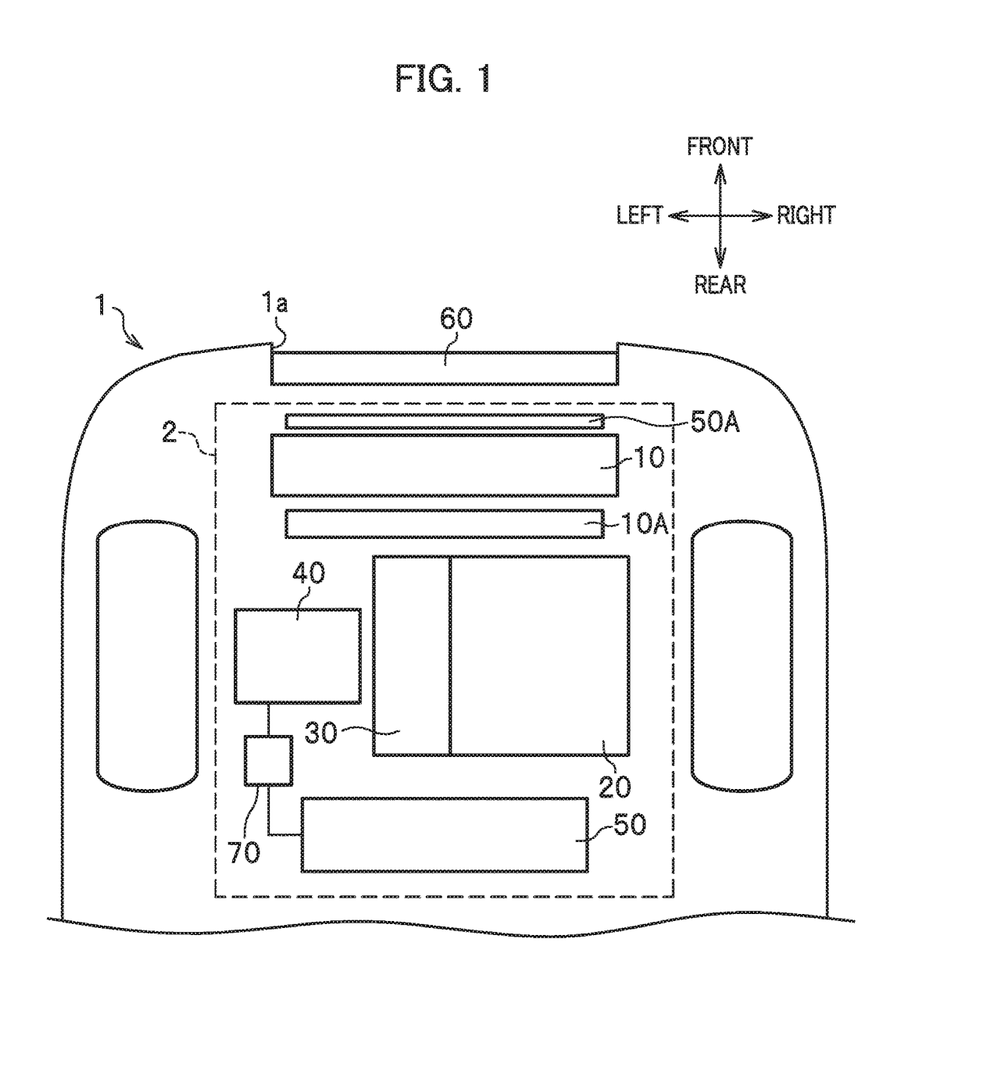
FIG. 1 is a plan view schematically showing a vehicle which uses a cooling system according to an embodiment of the present invention.

As shown in FIG. 1, a front part of a vehicle 1 according to an embodiment of the present invention includes an engine compartment (power compartment) 2 which is provided with a power source of the vehicle 1. The vehicle 1 includes: a radiator 10, a radiator fan 10A, an engine (first power source) 20, a transmission 30, a motor (second power source) 40, an air conditioner 50 and a condenser 50A which are provided in the engine compartment 2; shutter grille systems 60 provided respectively to opening portions (air guide ports) 1a formed in a front end surface of the vehicle 1, and configured to open and close the opening portions 1a; and a battery 70 configured to supply electric power to the air conditioner 50. To put it specifically, the vehicle 1 is a hybrid vehicle having both the engine 20 and the motor 40 as its power sources.

The components in the engine compartment 2 are arranged such that the shutter grille systems 60, the condenser 50A, the radiator 10, the radiator fan 10A, and the power sources (the engine 20 and the motor 40) are put in an order from the opening portions 1a toward the rear. In a case where the shutter grille systems 60 are opened, the condenser 50A, the radiator 10, the engine 20, the transmission 30, the motor 40 and the air conditioner 50 provided in the engine compartment 2 are cooled by external air which is guided into the engine compartment 2 from the opening portions 1a while the vehicle 1 is running. In a case where the shutter grille systems 60 are closed, the radiator fan 10A creates airflow from the front to the rear of the inside the engine compartment 2 to thereby cool the components in the engine compartment 2. Furthermore, in a case where the shutter grille systems 60 are opened, the radiator fan 10A increases the flow speed of external air which is guided into the engine compartment 2 from the opening portions 1a while the vehicle 1 is running, and thereby preferably cools the components in the engine compartment 2.

(Sensors)

Figure 2:
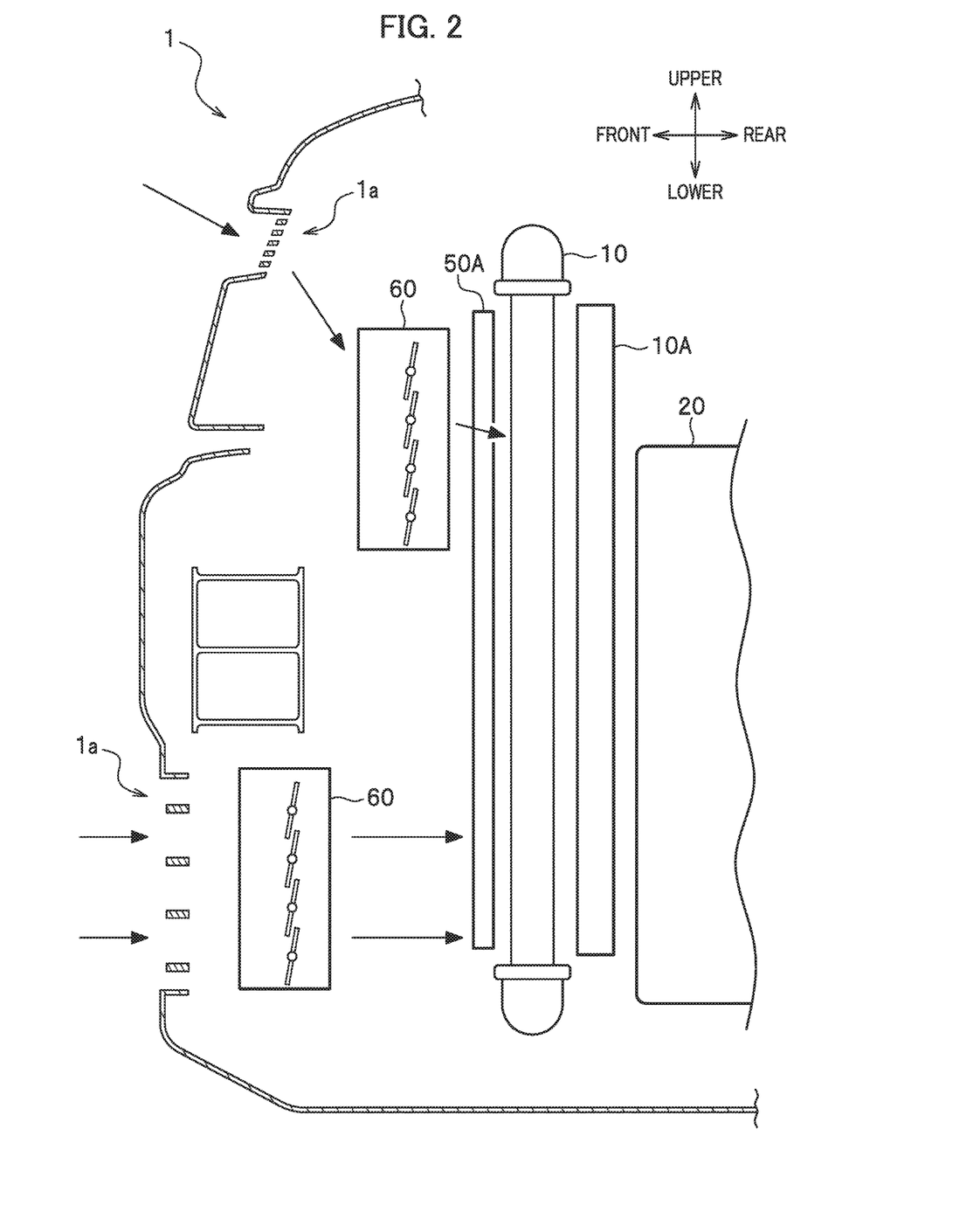
FIG. 2 is a side view schematically showing the vehicle which uses the cooling system according to the embodiment of the present invention.

As shown in FIG. 2, the vehicle 1 according to the embodiment of the present invention includes a radiator water temperature sensor 101, an engine water temperature sensor 102, an engine oil temperature sensor 103, an intake air temperature sensor 104, a sucked air amount sensor 105, an engine torque sensor 106, an engine revolution speed sensor 107, a transmission oil temperature sensor 108, a transmission torque sensor 109, a transmission revolution speed sensor 110, a motor torque sensor 111, a motor revolution speed sensor 112, a coolant pressure sensor 113, an external air temperature sensor 114, a passenger compartment temperature sensor 115, an air conditioner operation unit 116, a wheel speed sensor 117 provided to each wheel, a running mode operation unit 118, an ammeter 119, and a voltmeter 120.

The radiator water temperature sensor 101 is a sensor configured to detect temperature of cooling water which has completed heat exchange by passing through the radiator 10 (that is to say, radiator water temperature), and to output the detected radiator water temperature to an ECU 200, which will be described later.

The engine water temperature sensor 102 is a sensor configured to detect temperature of cooling water of the engine 20 (that is to say, engine water temperature), and to output the detected engine water temperature to the ECU 200.

The engine oil temperature sensor 103 is a sensor configured to detect temperature of lubricant of the engine 20 (that is to say, engine oil temperature), and to output the detected engine oil temperature to the ECU 200.

The intake air temperature sensor 104 is a sensor configured to detect temperature of intake air into the engine 20 (that is to say, intake air temperature), and to output the detected intake air temperature to the ECU 200.

The sucked air amount sensor 105 is a sensor configured to detect an amount of air sucked into the engine 20, and to output the detected sucked air amount to the ECU 200.

The engine torque sensor 106 is a sensor configured to detect torque of an output axle of the engine 20 (that is, engine torque), and to output the detected engine torque to the ECU 200.

The engine revolution speed sensor 107 is a sensor configured to detect a revolution speed of the output axle of the engine 20 (that is, an engine revolution speed), and to output the detected engine revolution speed to the ECU 200.

Results of the detection by the sensors 101 to 107 correspond to a power source load which is a load on one power source. In other words, the results of the detection by the sensors 101 to 107 are power source load-related parameters which increase as the load on the engine 20, the power source, becomes larger.

The transmission oil temperature sensor 108 is a sensor configured to detect temperature of lubricant of the transmission 30 (that is, transmission oil temperature), and to output the detected transmission oil temperature to the ECU 200.

The transmission torque sensor 109 is a sensor configured to detect torque of the transmission 30 (that is, transmission torque), and to output the detected transmission torque to the ECU 200.

The transmission revolution speed sensor 110 is a sensor configured to detect a revolution speed of the transmission 30 (that is, a transmission revolution speed), and to output the detected transmission revolution speed to the ECU 200.

The motor torque sensor 111 is a sensor configured to detect torque of the motor 40 (that is, motor torque), and to output the detected motor torque to the ECU 200.

The motor revolution speed sensor 112 is a sensor configured to detect a revolution speed of the motor 40 (that is, a motor revolution speed), and to output the detected motor revolution speed to the ECU 200.

Results of the detection by the sensors 111, 112 correspond to a power source load which is a load on the other power source. In other words, the results of the detection by the sensors 111, 112 are power source load-related parameters which increase as the load on the motor 40, the power source, becomes larger.

The coolant pressure sensor 113 is a sensor configured to detect pressure of coolant which has passed through a compressor in the air conditioner 50 (that is, coolant pressure), and to output the detected coolant pressure to the ECU 200.

The external air temperature sensor 114 is a sensor configured to detect temperature of external air (that is, external air temperature), and to output the detected external air temperature to the ECU 200.

The passenger compartment temperature sensor 115 is a sensor configured to detect temperature in the passenger compartment of the vehicle 1 (that is, passenger compartment temperature), and to output the detected passenger compartment temperature to the ECU 200.

The air conditioner operation unit 116 is provided to the inside of the passenger compartment of the vehicle 1, and includes buttons and the like to be used to set operation conditions for the air conditioner 50.

A result of the detection by the coolant pressure sensor 113 corresponds to an air conditioning load which is a load on the air conditioner 50. In other words, the result of the detection by the coolant pressure sensor 113 is an air conditioner load-related parameter which increases as the load on the air conditioner 50 becomes larger.

The wheel speed sensor 117 is a sensor configured to detect a revolution speed of a corresponding wheel of the vehicle 1 (that is, a wheel speed), and outputs the detected wheel speed to the ECU 200.

The running mode operation unit 118 is provided to the inside of the passenger compartment of the vehicle 1, and includes buttons and the like to be used to set running modes for the vehicle 1. The running modes include a normal mode for a normal driving, a sport mode for a higher driving performance than the normal mode, and an eco-mode for a lower fuel consumption than the normal mode.

The voltmeter 119 detects voltage of the battery 70, and outputs the detected voltage value to the ECU 200.

The ammeter 120 detects the strength of an electric current discharged from the battery 70, and outputs the detected electric current value to the ECU 20.

(ECU)

Figure 3:
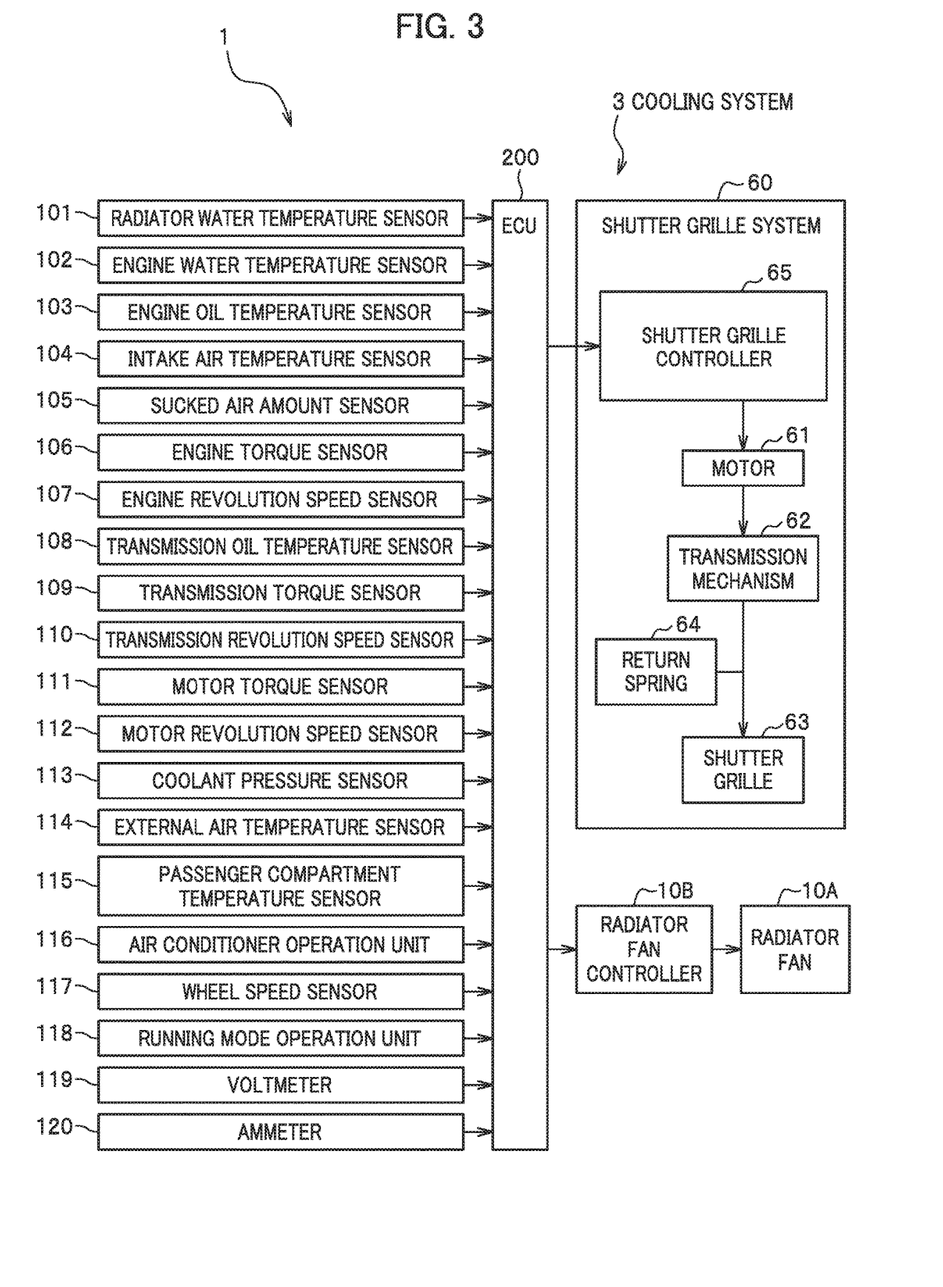
FIG. 3 is a diagram showing a system configuration of the vehicle which uses the cooling system according to the embodiment of the present invention.

The vehicle 1 further includes the electronic control unit (ECU) 200. The ECU 200 is formed from a central processing unit (CPU), a read-only memory (ROM), a random access memory (RAM) and output/input circuits. The ECU 200 is a control unit configured to control the components in the vehicle 1 based on the results of the detection by the sensors. In the embodiment, the ECU 200 outputs requests to open and close shutter grilles 63, to shutter grille controllers 65 of the shutter grille systems 60 from viewpoints of fuel consumption, marketability and function guarantee.

(Opening and Closing Requests for Fuel Consumption)

<<Function: Increase in Aerodynamic Performance>>

The ECU 200 outputs a closing request except for when the ECU 200 needs to output an opening request due to restrictions.

<<Function: Increase in Warming Performance (Inhibition of Heat Radiation>>

In a case where the transmission oil temperature is less than a closing determination threshold, the ECU 200 outputs a closing request.

In a case where the engine water temperature is less than a closing determination threshold, the ECU 200 outputs a closing request <<Function: Avoidance of High Engine Water Temperature>>

In a case where the engine water temperature is equal to or greater than an opening determination threshold, the ECU 200 outputs an opening request.

Immediately before the fan of the radiator 10 starts working based on the radiator water temperature and the engine water temperature, the ECU 200 outputs an opening request.

<<Function: Avoidance of High Transmission Oil Temperature>>

In a case where the transmission oil temperature is equal to or greater than an opening determination threshold (temperature which makes the efficiency of the transmission 30 lower), the ECU 200 outputs an opening request.

<<Function: Avoidance of High Engine Intake Air Temperature>>

In a case where the intake air temperature of the engine 20 is equal to or greater than an opening determination threshold, the ECU 200 outputs an opening request.

<<Function: Avoidance of Hindrance to Fuel Consumption Device>>

The ECU 200 outputs an opening request when a valve timing control (VTC) comes into in an operation-prohibited region.

The ECU 200 outputs an opening request when the idling rotation comes into a rotation increase region.

In a case where the engine water temperature is high, the ECU 200 outputs an opening request when a variable valve timing and lift electronic control system (VTEC) comes into an operation-prohibited region.

(Opening and Closing Request for Marketability)

<<Function: Securing of Air Conditioner Marketability>>

In a case where the coolant of the air conditioner 50 is at high pressure, the ECU 200 outputs an opening request when the fan of the radiator 10 is requested to increase the fan speed.

<<Function: Avoidance of Deterioration in Accuracy of Estimating Torque of Compressor of Air Conditioner 50>>

In a case where the coolant of the air conditioner 50 is at high pressure and the vehicle speed is low, the ECU 200 outputs an opening request when the fan of the radiator 10 is requested to decrease the fan speed.

<<Function: Coking Prevention>>

In a case where the vehicle 1 is a turbocharged vehicle, the ECU 200 outputs an opening request when temperature of air having been compressed by the compressor (not illustrated) of the turbocharger (that is to say, intake air temperature) is equal to or greater than coking start temperature.

(Opening and Closing Requests for Function Guarantee)

<<Function: Avoidance of High Engine Oil Temperature>>

In a case where the engine oil temperature is equal to or greater than an opening determination threshold when the fan of the radiator 10 is requested to increase the fan speed, the ECU 200 outputs an opening request.

<<Function: Avoidance of High Engine Water Temperature>>

In a case where the engine water temperature is equal to or greater than heat resistance temperature of the components in the engine compartment 2, the ECU 200 outputs an opening request.

<<Function: Avoidance of High Transmission Oil Temperature>>

In a case where the transmission oil temperature is equal to or greater than an opening determination threshold, the ECU 200 outputs an opening request.

In short, based on the current temperatures of the respective components in the engine compartment 2 (the radiator water temperature, the engine water temperature, the engine oil temperature, the transmission oil temperature and the like), the ECU 200 outputs opening requests in the case where the temperatures are equal to or greater than the opening determination thresholds, and outputs closing requests in the case where the temperatures are less than the closing determination thresholds.

Furthermore, the ECU 200 outputs an opening request and a closing request, based on the parameters related to a rise in the temperature inside the engine compartment 2, inclusive of the coolant pressure, the external air temperature and the like.

Moreover, the ECU 200 outputs an opening request and a closing request, based on how the engine 20 is controlled.

Depending on the parameters, the ECU 200 determines on a regular basis whether to output an opening request and a closing request, and outputs either an opening request or a closing request based on a determination result. Incidentally, although the embodiment is discussing the ECU 200 as the single control unit, the ECU 200 may be divided in multiple control units inclusive of an engine ECU.

Meanwhile, the ECU 200 outputs results of the determination by the sensors 101 to 120 to the shutter grille controllers 65 of the shutter grille systems 60, and a radiator fan controller 10B. In addition, the ECU 200 calculates a vehicle speed of the vehicle 1 based on results of the detection by the wheel speed sensors 117, and outputs the calculated vehicle speed to the shutter grille controllers 65 and the radiator fan controller 10B. Moreover, the ECU 200 calculates (estimates) the charge level, or the state of charge (SoC), of the battery 70 based on results of the detection by the voltmeter 119 and the ammeter 120, and outputs the calculated SoC to the shutter grille controllers 65 and the radiator fan controller 10B.

(Cooling System)

As shown in FIG. 2, the cooling system 3 according to the embodiment of the present invention is a system configured to cool the radiator 10, the engine 20 and the like inside the engine compartment 2. The cooling system 3 includes the radiator 10, the radiator fan 10A, the radiator fan controller 10B, the condenser 50A and the shutter grille systems 60.

(Radiator)

The radiator 10 is provided in the back of the shutter grilles 63, which will be described later. The radiator 10 is a heat exchanger for coolant, configured to transfer (radiate) heat from the coolant for the engine 20 to the external air by allowing the coolant to flow through the inside of the radiator 10.

(Radiator Fan)

The radiator fan 10A is provided between the radiator 10 in front of the radiator fan 10A and the engine 20 in the back of radiator fan 10A. While rotating under the control of the radiator fan controller 10B, which will be described later, the radiator fan 10A guides air into the radiator fan 10A from the opening portions 1a, and sends the air to the engine 20 and the like. Thereby, the radiator fan 10A cools the radiator 10 in front of the radiator fan 10A, and the engine 20 and the like in the back of the radiator fan 10A. Furthermore, even in a case where the radiator fan 10A is out of operation based on the control from the radiator fan controller 10B, the radiator fan 10A naturally rotates because of wind which is guided into the radiator fan 10A while the vehicle 1 is running. The revolution speed at which the radiator fan 10A rotates under the control of the radiator fan controller 10B is set larger than the revolution speed at which the radiator fan 10A naturally rotates while the radiator fan 10A is out of operation. Incidentally, "the radiator fan 10A . . . sends the air" includes not only "the rotation of the radiator fan 10A sends the air to the engine 20 which is provided downstream of the radiator fan 10A," but also "the rotation of the radiator fan 10A sucks the air upstream of the radiator fan 10A into the radiator fan 10A, and thereby sends the air to the condenser 50A and the radiator 10 which are provided upstream of the radiator fan 10A."

(Radiator Fan Controller)

The radiator fan controller 10B controls the radiator fan 10A based on results of the detection by the radiator water temperature sensor 101 and the like.

(Condenser)

The condenser 50A is provided between the shutter grilles 63 in front of the condenser 50A and the radiator 10 in the back of the condenser 50A. The condenser 50A is a heat exchanger for air conditioning coolant, configured to transfer (radiate) heat from the coolant for the air conditioner 50 to the external air by allowing the air conditioning coolant to flow through the inside of the condenser 50A.

(Shutter Grille System)

The shutter grille systems 60 are systems provided respectively to the opening portions 1a for guiding air to the inside of the engine compartment 2, and configured to open and close the opening portions 1a. The shutter grille systems 60 respectively include motors 61 provided to air guide ports, transmission mechanisms 62, the shutter grilles 63, return springs 64, and the shutter grille controllers 65. In the embodiment, two shutter grille systems 60 each including one motor 61, one transmission mechanism 62, one shutter grille 63, one return spring 64 and one shutter grille controller 65 are provided respectively to two opening portions 1a, which are arranged vertically.

In the embodiment, in each shutter grille system 60, the motor 61, the transmission mechanism 62, the return spring 64 and the shutter grille controller 65 are formed into a single unit. In other words, the motor 61, the transmission mechanism 62 and the shutter grille controller 65 are contained in a housing (not illustrated), as well as the return spring 64 is attached to an output shaft of the transmission mechanism 62 which projects out from the housing.

<<Motor>>

The motor 61 is a power source configured to generate driving force (rotational force) for opening and closing the shutter grille 63.

<<Transmission Mechanism>>

The transmission mechanism 62 is formed from multiple gears and the like, and transmits the rotational force generated by the motor 61 to the shutter grille 63.

<<Shutter Grille>>

The shutter grille 63 is provided to each opening portion 1a formed in the front surface of the vehicle 1, and is a shutter main body configured to open and close the opening portion 1a. The shutter grille 63 includes multiple blades arranged in the vertical direction. The shutter grille 63 is capable of taking two conditions: a closing condition in which the shutter grille 63 closes the opening portion 1a by orienting the multiple blades substantially in the vertical direction; and an opening condition in which the shutter grille 63 opens the opening portion 1a by orienting the multiple blades substantially in the horizontal direction. The shutter grille 63 further includes an opening portion (not illustrated) which allows air to be guided to the engine 20 and the like while the shutter grille 63 is closed.

<<Return Spring>>

The return spring 64 is a biasing member configured to bias the shutter grille 63 in the closing direction. In this embodiment, the return spring 64 is a spiral spring attached to the output shaft of the transmission mechanism 63.

In the embodiment, the shutter grille system 60 is a normally open shutter. To put it specifically, while the motor 61 is not driving, the shutter grille 63 takes the opening condition because of biasing force of the return spring 64. On the other hand, while the motor 61 is driving, the shutter grille 63 takes the closing condition because of the rotational force of the motor 61 which resists the biasing force of the return spring 64. Thus, the shutter grille system 60 needs electric power to close the shutter grille 63 and to keep the shutter grille 63 closed, but needs no electric power to open the shutter grille 63 and to keep the shutter grille 63 opened.

While the vehicle 1 is running with the shutter grille 63 closed, external air hits the shutter grille 63 in the closing condition, and no external air is accordingly guided to the inside of the engine compartment 2. This condition enhances the aerodynamic performance of the vehicle 1, and the warming performance of the inside of the engine compartment 2.

While the vehicle 1 is running with the shutter grille 63 opened, external air is guided to the inside of the engine compartment 2 via the shutter grille 63 in the opening condition. This condition enhances the cooling performance of the inside of the engine compartment 2.

<<Shutter Grille Controller>>

The shutter grille controller 65 obtains an opening request and a closing request which are outputted from the ECU 200, and controls the motor 61 based on the obtained opening request and closing request. Thereby, the shutter grille controller 65 opens and closes the shutter grille 63.

<<Control by Radiator Fan controller and Shutter Grille Controller>>

The radiator fan controller 10B controls the radiator fan 10A based on things such as detection results from the radiator water temperature sensor 101, while the shutter grille controller 65 controls the shutter grille 63 based on things such as detection results from the radiator water temperature sensor 101. In the embodiment, the radiator fan controller 10B is capable of controlling the radiator fan 10A in two steps: stop and operation. Otherwise, the radiator fan controller 10B is capable of controlling the radiator fan 10A in three steps: stop, Lo operation (low output at low revolution speed), and Hi operation (high output at high revolution speed).

In addition, the shutter grille controller 65 and the radiator fan controller 10B perform control to close the shutter grille 63 and stop the radiator fan 10A. In this case, none of the air conditioning coolant of the condenser 50A, the coolant of the radiator 10 and the engine 20 is cooled. Particularly, the engine 20 is warmed up. This control is employed, for example, in a case where both the engine load and the air conditioning load are low.

Furthermore, the shutter grille controller 65 and the radiator fan controller 10B perform control to close the shutter grille 63 and operate the radiator fan 10A. In this case, the air conditioning coolant of the condenser 50A, the coolant of the radiator 10 and the engine 20 are cooled by airflow inside the engine compartment 2 which is generated by the radiator fan 10A. This control is employed, for example, in a case where the air conditioning load is high while the engine load is low.

Moreover, the shutter grille controller 65 and the radiator fan controller 10B perform control to open the shutter grille 63 and operate the radiator fan 10A. In this case, the air conditioning coolant of the condenser 50A, the coolant of the radiator 10 and the engine 20 is cooled by the flow of external air which is guided in via the shutter grille 63, and which is strengthened by the radiator fan 10A. This control is employed, for example, in a case where both the engine load and the air conditioning load are high.

OPERATION EXAMPLES

Descriptions will be hereinbelow provided for operation examples of the shutter grille system 60 according to the embodiment of the present invention. For the following operation examples, the shutter grille system 60 employs the engine water temperature and the air conditioning coolant pressure as the power source load and the air conditioning load. Furthermore, let us assume an initial control state in which the shutter grille 63 is closed while the radiator fan 10A is out of operation.

First Operation Example

Figure 4:
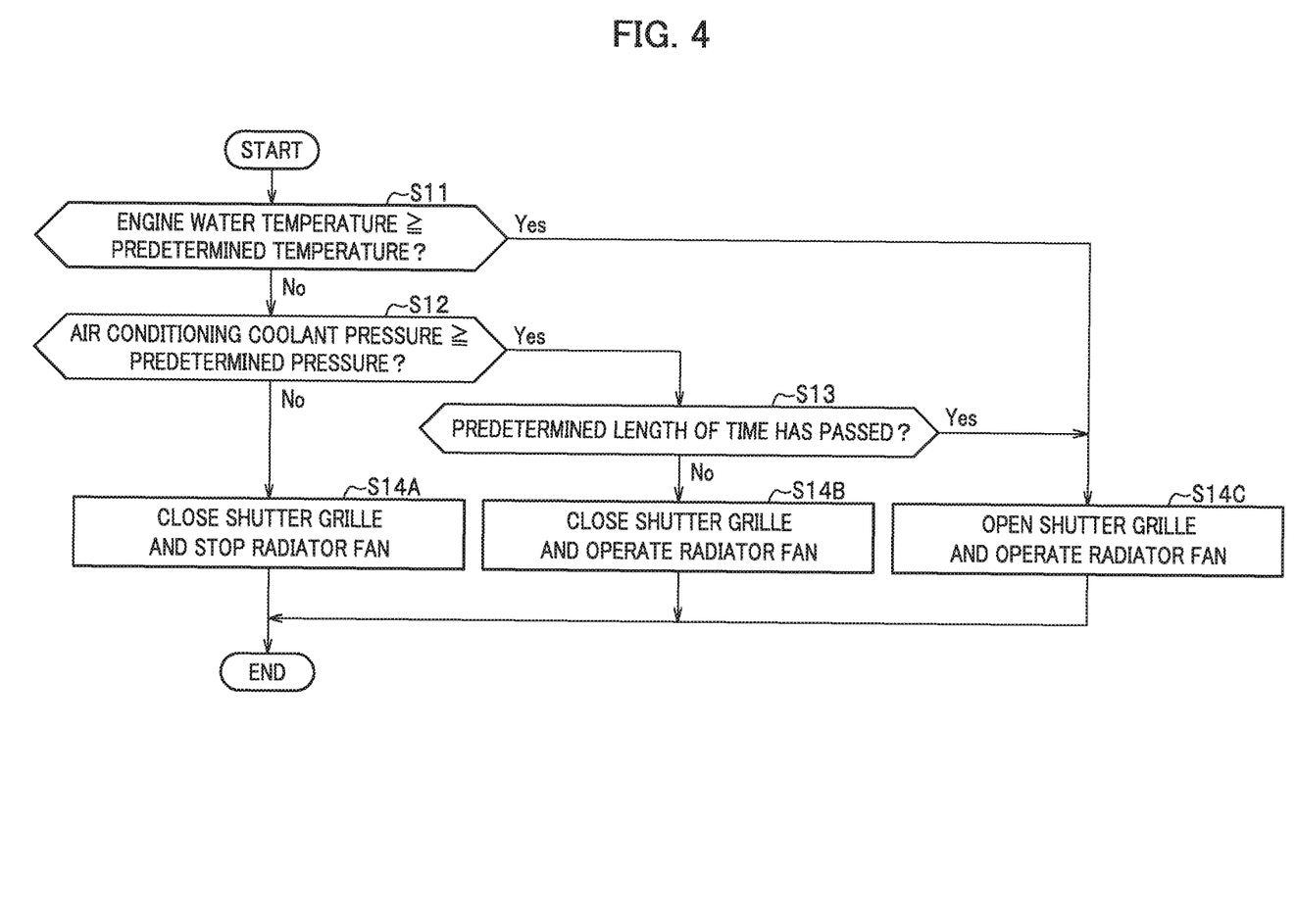
FIG. 4 is a flowchart for explaining a first operation example of the cooling system according to the embodiment of the present invention.

In a first operation example, based on detection results from the engine water temperature sensor 102 and the coolant pressure sensor 113, the shutter grille controller 65 and the radiator fan controller 10B control the opening and closing of the shutter grille 63, and concurrently control the radiator fan 10A in the two steps: stop and operation.

As shown in FIG. 4, if the engine water temperature is less than a predetermined temperature (No in step S11), and if the air conditioning coolant pressure is less than a predetermined pressure (No in step S12), the shutter grille controller 65 closes the shutter grille 63 while the radiator fan controller 10B stops the radiator fan 10A (in step S14A).

Meanwhile, if the engine water temperature is less than the predetermined temperature (No in step S11), and if the air conditioning coolant pressure is equal to or greater than the predetermined pressure (Yes in step S12), as well as if a predetermined length of time has not passed yet since these conditions are satisfied (No in step S13), the shutter grille controller 65 closes the shutter grille 63 while the radiator fan controller 10B operates the radiator fan 10A (in step S14B).

In other words, even in the case where the engine water temperature and the air conditioning coolant pressure are high, the shutter grille controller 65 and the radiator fan controller 10B perform the cooling by operating the radiator fan 10A with the shutter grille 63 closed until the predetermined length of time passes. This makes it possible to achieve the aerodynamic performance and the cooling performance at the same time. This further makes it possible to prevent the engine 20 from being cooled too much, and to thereby achieve the warming performance simultaneously.

Besides, if the engine water temperature is less than the predetermined temperature (No in step S11), and if the air conditioning coolant pressure is equal to or greater than the predetermined pressure (Yes in step S12), as well as if the predetermined length of time has passed since these conditions are satisfied (Yes in step S13), the shutter grille controller 65 opens the shutter grille 63 while the radiator fan controller 10B operates the radiator fan 10A (in step S14C).

Similarly, if the engine water temperature is equal to or greater than the predetermined temperature (Yes in step S11), the shutter grille controller 65 opens the shutter grille 63 while the radiator fan controller 10B operates the radiator fan 10A (in step S14C).

According to the first operation example, in the case where the engine 20 is not at high load while the air conditioner 50 is at high load, the radiator fan 10A is operated with the shutter grille 63 closed. The shutter grille system 60, therefore, is capable of achieving the prevention of deterioration in fuel consumption due to deterioration in the aerodynamic performance, the cooling performance, and the warming performance at the same time.

Furthermore, in the case where the length of time for which the radiator fan 10A is operating with the shutter grille 63 closed reaches the predetermined length of time, the shutter grille system 60 opens the shutter grille 63. This means that the shutter grille system 60 opens the shutter grille 63 only in the case where the shutter grille system 60 becomes no longer capable of securing the cooling performance of the air conditioning coolant by use of the radiator fan 10A alone. The shutter grille system 60, therefore, is capable of achieving the prevention of deterioration in fuel consumption due to the aerodynamic performance, and the cooling performance at the same time more preferably.

Second Operation Example

Figure 5:
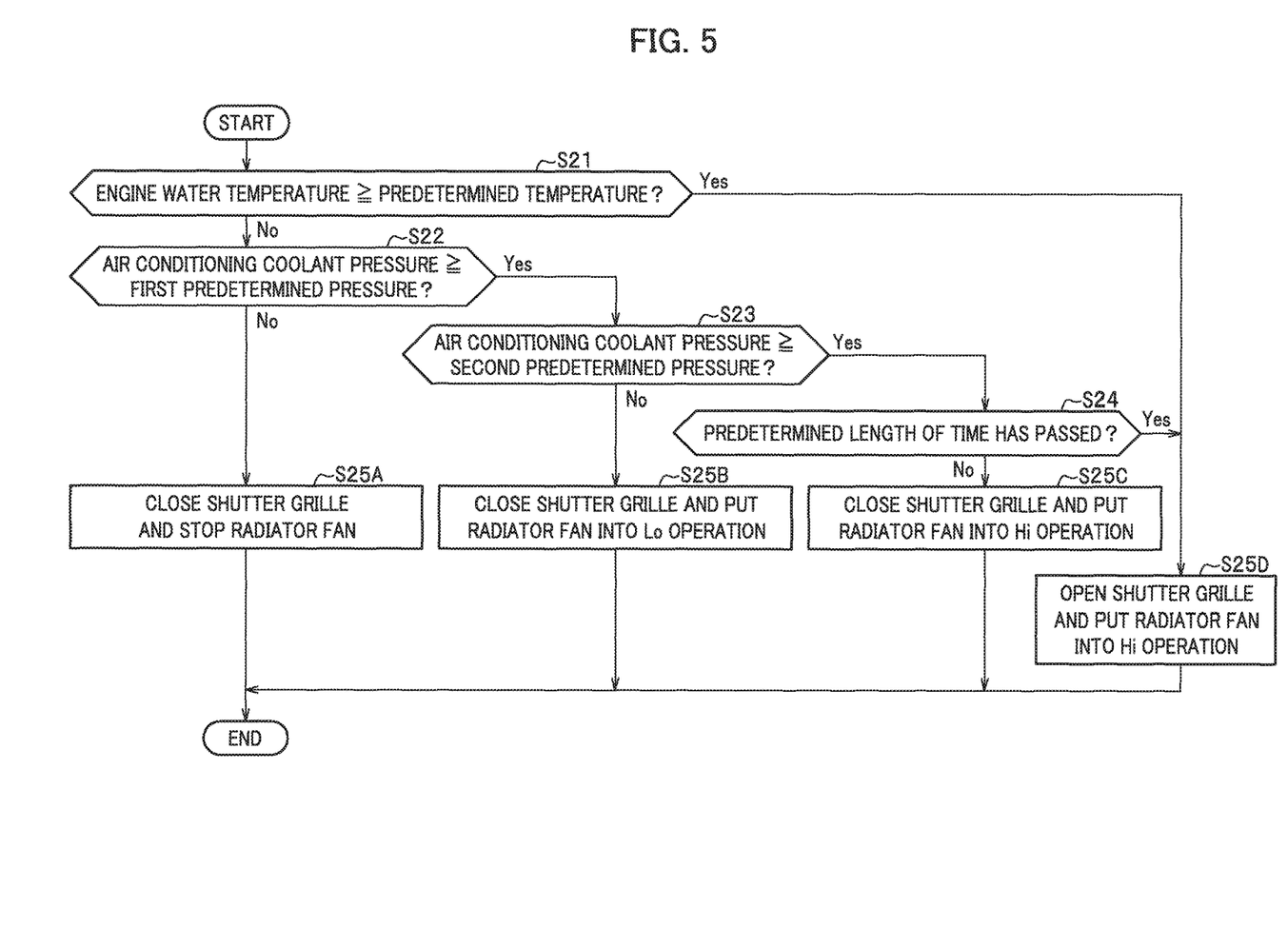
FIG. 5 is a flowchart for explaining a second operation example of the cooling system according to the embodiment of the present invention.

In a second operation example, based on detection results from the engine water temperature sensor 102 and the coolant pressure sensor 113, the shutter grille controller 65 and the radiator fan controller 10B control the opening and closing of the shutter grille 63, and concurrently control the radiator fan 10A in the three steps: stop, Lo operation and Hi operation.

As shown in FIG. 5, if the engine water temperature is less than the predetermined temperature (No in step S21), and if the air conditioning coolant pressure is less than a first predetermined pressure (No in step S22), the shutter grille controller 65 closes the shutter grille 63 while the radiator fan controller 10B stops the radiator fan 10A (in step S25A).

Meanwhile, if the engine water temperature is less than the predetermined temperature (No in step S21), and if the air conditioning coolant pressure is equal to or greater than the first predetermined pressure (Yes in step S22), as well as if the air conditioning coolant pressure is less than a second predetermined pressure (where the second predetermined pressure>the first predetermined pressure) (No in step S23), the shutter grille controller 65 closes the shutter grille 63 while the radiator fan controller 10B puts the radiator fan 10A into the Lo operation (low output at low revolution speed) (in step S25B).

In other words, in the case where the air conditioning coolant pressure is equal to or greater than the first predetermined pressure but less than the second predetermined pressure although the engine water temperature is high, the shutter grille controller 65 and the radiator fan controller 10B perform the cooling by putting the radiator fan 10A into the Lo operation while the shutter grille 63 closed. This makes it possible to achieve the aerodynamic performance and the cooling performance at the same time. This further makes it possible to prevent the engine 20 from being cooled too much, and to thereby achieve the warming performance simultaneously.

Furthermore, if the engine water temperature is less than the predetermined temperature (No in step S21), and if the air conditioning coolant pressure is equal to or greater than the first predetermined pressure (Yes in step S22), as well as if the air conditioning coolant pressure is equal to or greater than the second predetermined pressure (Yes in step S23), and if a predetermined length of time has not passed yet since these conditions are satisfied (No in step S24), the shutter grille controller 65 closes the shutter grille 63 while the radiator fan controller 10B puts the radiator fan 10A into the Hi operation (high output at high revolution speed) (step S25C).

In other words, even in the case where the engine water temperature and the air conditioning coolant pressure are high, the shutter grille controller 65 and the radiator fan controller 10B perform the cooling by putting the radiator fan 10A into the Hi operation with the shutter grille 63 closed until the predetermined length of time passes. This makes it possible to achieve the aerodynamic performance and the cooling performance as the same time. This further makes it possible to prevent the engine 20 from being cooled too much, and to thereby achieve the warming performance simultaneously.

Moreover, if the engine water temperature is less than the predetermined temperature (No in step S21), and if the air conditioning coolant pressure is equal to or greater than the first predetermined pressure (Yes in step S22), as well as if the air conditioning coolant pressure is equal to or greater than the second predetermined pressure (Yes in step S23), and if the predetermined length of time has passed since these conditions are satisfied (Yes in step S24), the shutter grille controller 65 opens the shutter grille 63 while the radiator fan controller 10B puts the radiator fan 10A into the Hi operation (high output at high revolution speed) (step S25D).

Similarly, if the engine water temperature is equal to or greater than the predetermined temperature (Yes in step S21), the shutter grille controller 65 opens the shutter grille 63 while the radiator fan controller 10B puts the radiator fan 10A into the Hi operation (high output at high revolution speed) (in step S25D).

According to the second operation example, the operational strength of the radiator fan 10A is changed depending on the air conditioning coolant pressure. The shutter grille system 60, therefore, is capable of achieving the inhibition of power consumption and the cooling performance at the same time.

Third Operation Example

Figure 6:
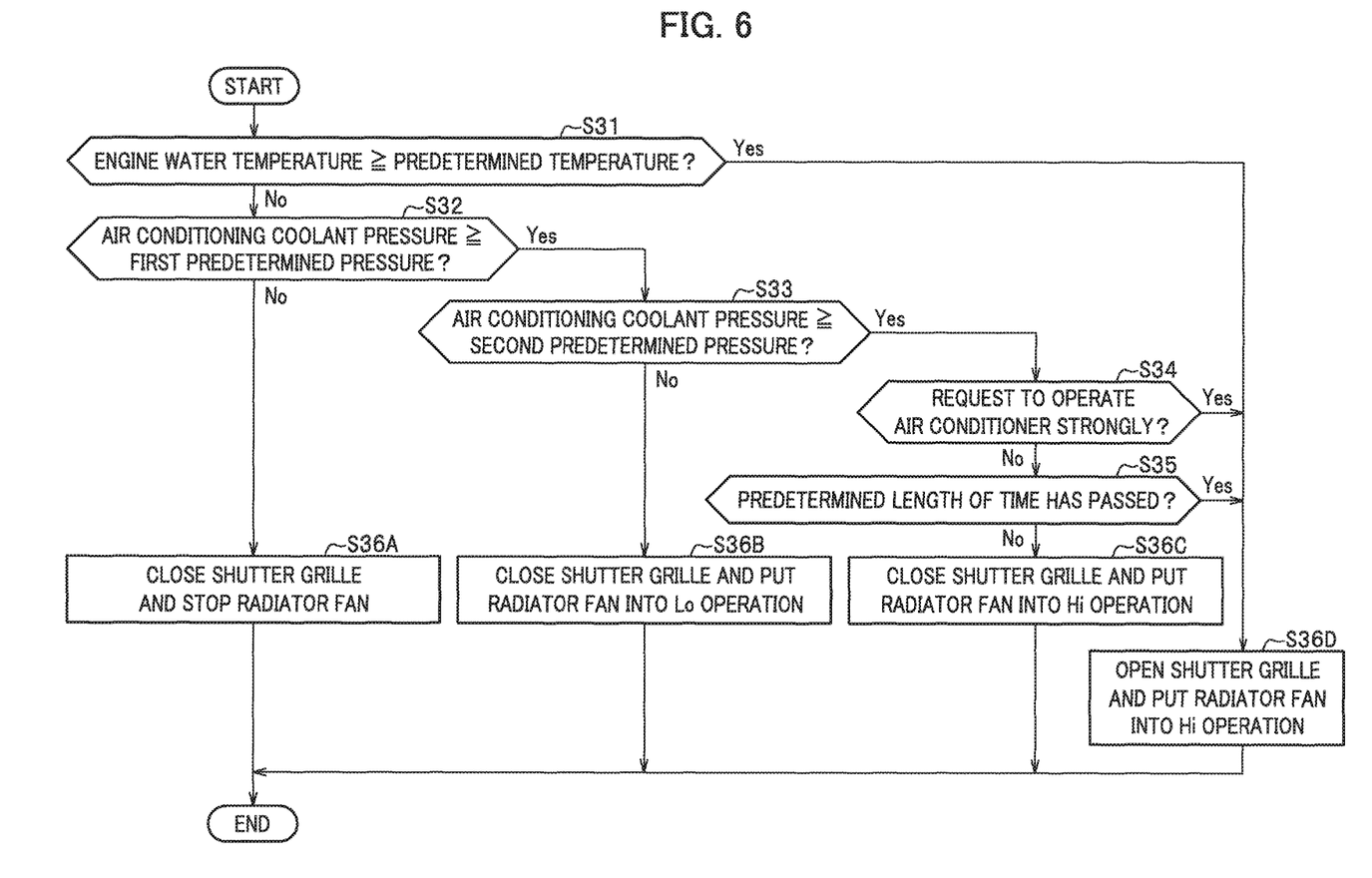
FIG. 6 is a flowchart for explaining a third operation example of the cooling system according to the embodiment of the present invention.

In a third operation example, based on detection results from the engine water temperature sensor 102 and the coolant pressure sensor 113 as well as a manipulation result from the air conditioner operation unit 116, the shutter grille controller 65 and the radiator fan controller 10B control the opening and closing of the shutter grille 63, and concurrently control the radiator fan 10A in the three steps: stop, Lo operation and Hi operation.

As shown in FIG. 6, if the engine water temperature is less than the predetermined temperature (No in step S31), and if the air conditioning coolant pressure is less than the first predetermined pressure (No in step S32), the shutter grille controller 65 closes the shutter grille 63 while the radiator fan controller 10B stops the radiator fan 10A (in step S36A).

Meanwhile, if the engine water temperature is less than the predetermined temperature (No in step S31), and if the air conditioning coolant pressure is equal to or greater than the first predetermined pressure (Yes in step S32), as well as if the air conditioning coolant pressure is less than the second predetermined pressure (where the second predetermined pressure>the first predetermined pressure) (No in step S33), the shutter grille controller 65 closes the shutter grille 63 while the radiator fan controller 10B puts the radiator fan 10A into the Lo operation (low output at low revolution speed) (in step S36B).

In other words, in the case where the air conditioning coolant pressure is equal to or greater than the first predetermined pressure but less than the second predetermined pressure although the engine water temperature is high, the shutter grille controller 65 and the radiator fan controller 10B perform the cooling by putting the radiator fan 10A into the Lo operation while the shutter grille 63 closed. This makes it possible to achieve the aerodynamic performance and the cooling performance at the same time. This further makes it possible to prevent the engine 20 from being cooled too much, and to thereby achieve the warming performance simultaneously.

Furthermore, if the engine water temperature is less than the predetermined temperature (No in step S31), and if the air conditioning coolant pressure is equal to or greater than the first predetermined pressure (Yes in step S32), and if the air conditioning coolant pressure is equal to or greater than the second predetermined pressure (Yes in step S33), as well as if there is no request to operate the air conditioner strongly (No in step S34), and if a predetermined length of time has not passed yet since these conditions are satisfied (No in step S35), the shutter grille controller 65 closes the shutter grille 63 while the radiator fan controller 10B puts the radiator fan 10A into the Hi operation (high output at high revolution speed) (step S36C).

In other words, even in the case where the engine water temperature and the air conditioning coolant pressure are high, if there is no request to operate the air conditioner strongly, the shutter grille controller 65 and the radiator fan controller 10B perform the cooling by putting the radiator fan 10A into the Hi operation with the shutter grille 63 closed until the predetermined length of time passes. This makes it possible to achieve the aerodynamic performance and the cooling performance as the same time. This further makes it possible to prevent the engine 20 from being cooled too much, and to thereby achieve the warming performance simultaneously.

Moreover, if the engine water temperature is less than the predetermined temperature (No in step S31), and if the air conditioning coolant pressure is equal to or greater than the first predetermined pressure (Yes in step S32), and if the air conditioning coolant pressure is equal to or greater than the second predetermined pressure (Yes in step S33), as well as if there is no request to operate the air conditioner strongly (No in step S34), and if the predetermined length of time has passed since these conditions are satisfied (Yes in step S35), the shutter grille controller 65 opens the shutter grille 63 while the radiator fan controller 10B puts the radiator fan 10A into the Hi operation (high output at high revolution speed) (step S36D).

Similarly, if the engine water temperature is less than the predetermined temperature (No in step S31), and if the air conditioning coolant pressure is equal to or greater than the first predetermined pressure (Yes in step S32), and if the air conditioning coolant pressure is equal to or greater than the second predetermined pressure (Yes in step S33), as well as if there is a request to operate the air conditioner strongly (Yes in step S34), the shutter grille controller 65 opens the shutter grille 63 while the radiator fan controller 10B puts the radiator fan 10A into the Hi operation (high output at high revolution speed) (step S36D).

In this respect, examples of the request to operate the air conditioner 50 strongly include: the request based on a manipulation result from the air conditioner operation unit 116; and the request based on the temperature difference obtained from the detection results from the external air temperature sensor 114 and the passenger compartment temperature sensor 115.

Similarly, if the engine water temperature is equal to or greater than the predetermined temperature (Yes in step S31), the shutter grille controller 65 opens the shutter grille 63 while the radiator fan controller 10B puts the radiator fan 10A into the Hi operation (high output at high revolution speed) (step S36D).

According to the third operation example, the shutter grille 63 is opened in the case where the operation amount of the air conditioner 50 is equal to or greater than the predetermined operation amount (in this case, the strong operation). The shutter grille system 60, therefore, is capable of achieving the cooling performance depending on the operation amount of the air conditioner 50.

Fourth Operation Example

Figure 7:
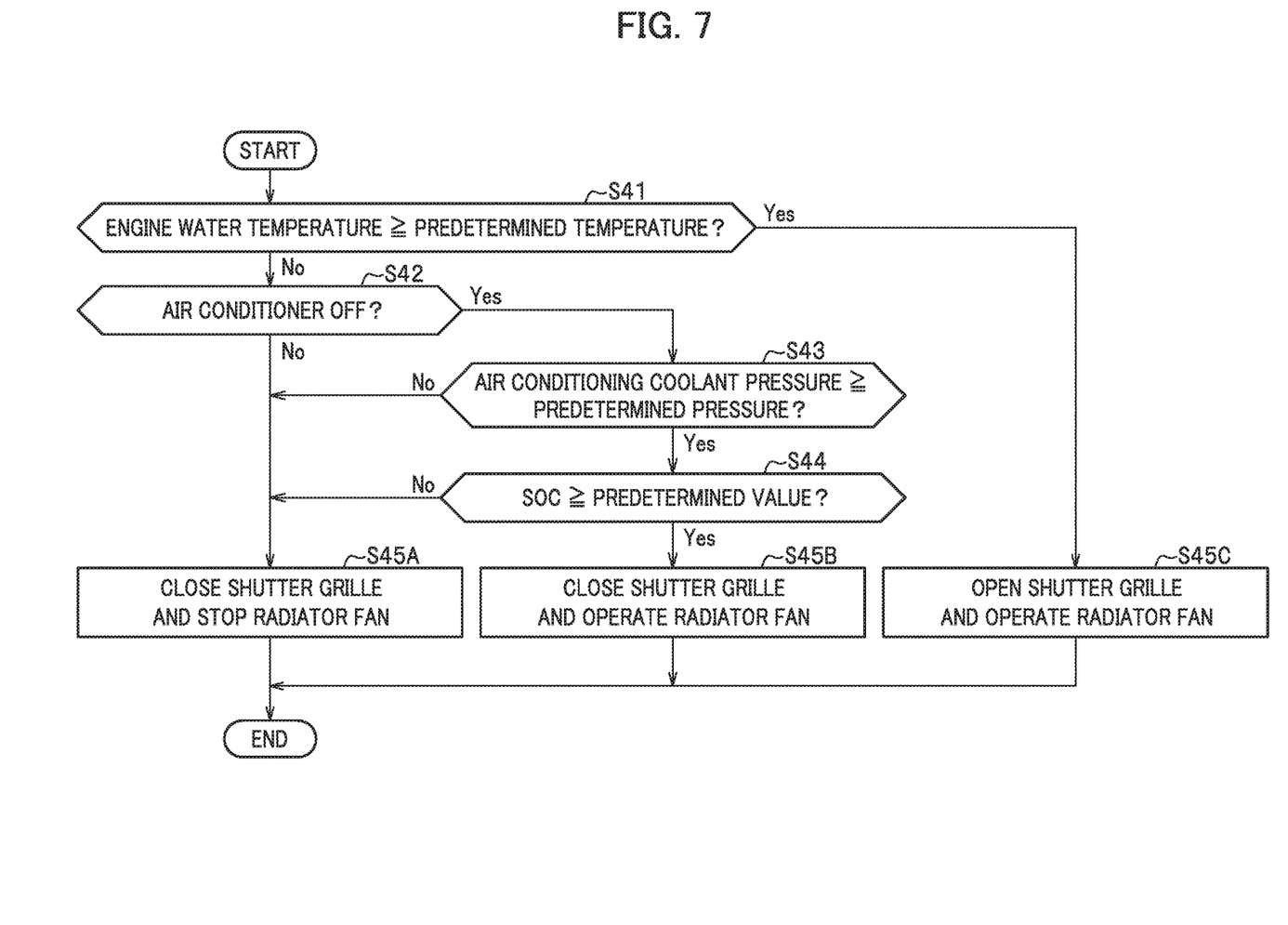
FIG. 7 is a flowchart for explaining a fourth operation example of the cooling system according to the embodiment of the present invention.

In a fourth operation example, based on detection results from the engine water temperature sensor 102 and the coolant pressure sensor 113, as well as a manipulation result from the air conditioner operation unit 116 and a result of calculating the SoC, the shutter grille controller 65 and the radiator fan controller 10B control the opening and closing of the shutter grille 63, and concurrently control the radiator fan 10A in the two steps: stop and operation.

As shown in FIG. 7, if the engine water temperature is less than the predetermined temperature (No in step S41), and if the air conditioner is ON (No in step S42), the shutter grille controller 65 closes the shutter grille 63 while the radiator fan controller 10B stops the radiator fan 10A (in step S45A).

Similarly, if the engine water temperature is less than the predetermined temperature (No in step S41), and if the air conditioner is OFF (Yes in step S42), as well as if the air conditioning coolant pressure is less than the predetermined pressure (No in step S43), the shutter grille controller 65 closes the shutter grille 63 while the radiator fan controller 10B stops the radiator fan 10A (in step S45A).

Similarly, if the engine water temperature is less than the predetermined temperature (No in step S41), and if the air conditioner is OFF (Yes in step S42), as well as if the air conditioning coolant pressure is equal to or greater than the predetermined pressure (Yes in step S43), and if the SoC is less than a predetermined value (No in step S44), the shutter grille controller 65 closes the shutter grille 63 while the radiator fan controller 10B stops the radiator fan 10A (in step S45A).

In other words, even in the case where the engine water temperature and the air conditioning coolant pressure are high, if the SoC is less than the predetermined value, the shutter grille controller 65 and the radiator fan controller 10B put the shutter grille 63 into the closing state, and concurrently stop the radiator fan 10A.

Meanwhile, if the engine water temperature is less than the predetermined temperature (No in step S41), and if the air conditioner is OFF (Yes in step S42), as well as if the air conditioning coolant pressure is equal to or greater than the predetermined pressure (Yes in step S43), and if the SoC is equal to or greater than the predetermined value (Yes in step S44), the shutter grille controller 65 closes the shutter grille 63 while the radiator fan controller 10B operates the radiator fan 10A (in step S45B).

Furthermore, if the engine water temperature is equal to or greater than the predetermined temperature (Yes in step S41), the shutter grille controller 65 opens the shutter grille 63 while the radiator fan controller 10B operates the radiator fan 10A (in step S45C).

According to the fourth embodiment, even in the case where the air conditioner 50 is OFF, if the SoC is equal to or greater than the predetermined value, the radiator fan 10A is operated with the shutter grille 63 closed. There is likelihood, therefore, that the air conditioning coolant pressure becomes high when the air conditioner 50 is turned ON. In this case, if on condition that the SoC is sufficient, the radiator fan 10A is rotated before the air conditioner 50 is turned ON, it is possible to prevent the air conditioning coolant pressure from becoming high next time the air conditioner 50 is turned ON.

Fifth Operation Example

Figure 8:
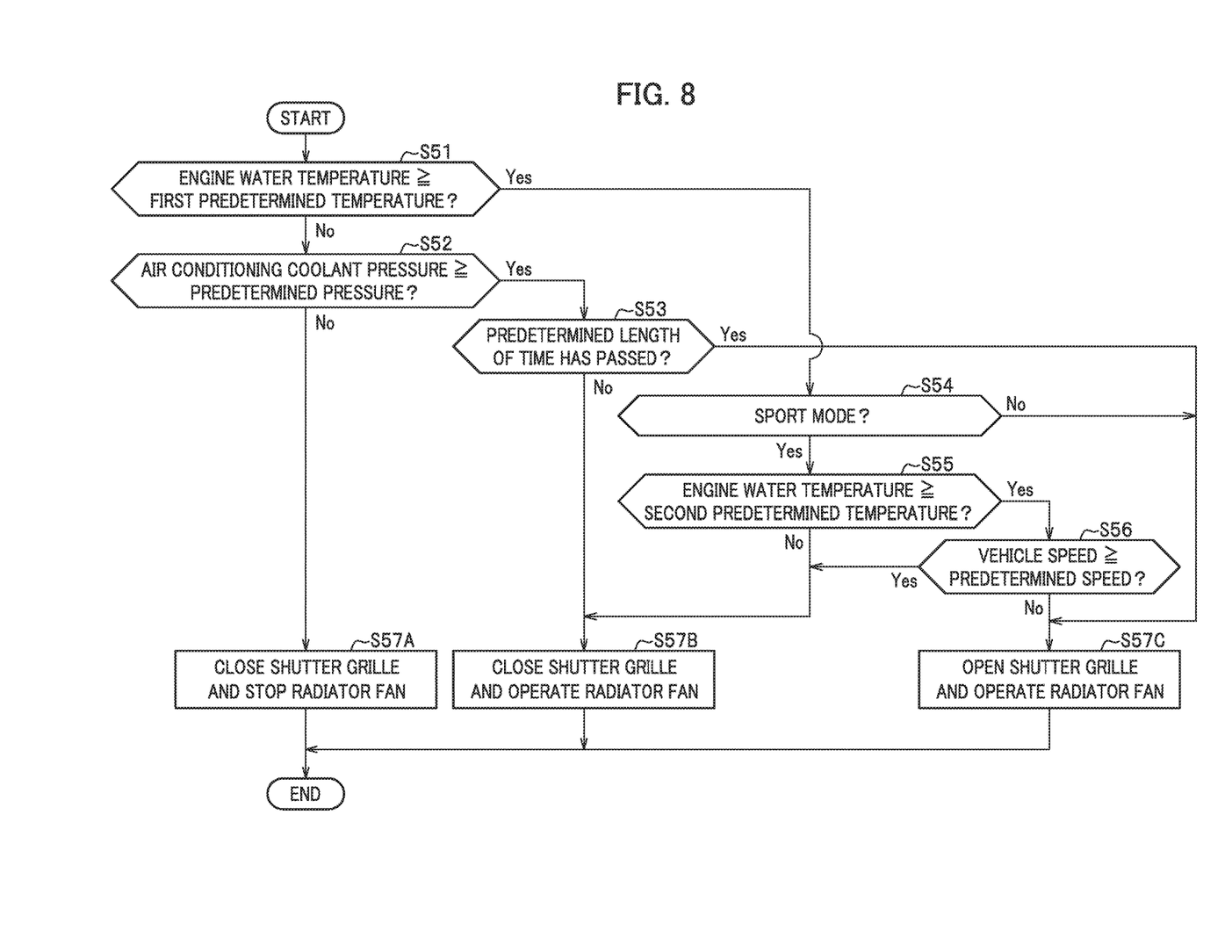
FIG. 8 is a flowchart for explaining a fifth operation example of the cooling system according to the embodiment of the present invention.

In a fifth operation example, based on detection results from the engine water temperature sensor 102 and the coolant pressure sensor 113, as well as a manipulation result from the running mode operation unit 118 and a result of calculating the vehicle speed, the shutter grille controller 65 and the radiator fan controller 10B control the opening and closing of the shutter grille 63, and concurrently control the radiator fan 10A in the two steps: stop and operation.

As shown in FIG. 8, if the engine water temperature is less than a first predetermined temperature (No in step S51), and if the air conditioning coolant pressure is less than the predetermine pressure (No in step S52), the shutter grille controller 65 closes the shutter grille 63 while the radiator fan controller 10B stops the radiator fan 10A (in step S57A).

Meanwhile, if the engine water temperature is less than the first predetermined temperature (No in step S51), and if the air conditioning coolant pressure is equal to or greater than the predetermined pressure (Yes in step S52), as well as if a predetermined length of time has not passed yet since these conditions are satisfied (No in step S53), the shutter grille controller 65 closes the shutter grille 63 while the radiator fan controller 10B operates the radiator fan 10A (in step S57B).

In other words, even in the case where the engine water temperature and the air conditioning coolant pressure are high, the shutter grille controller 65 and the radiator fan controller 10B perform the cooling by operating the radiator fan 10A with the shutter grille 63 closed until the predetermined length of time passes. This makes it possible to achieve the aerodynamic performance and the cooling performance at the same time. This further makes it possible to prevent the engine 20 from being cooled too much, and to thereby achieve the warming performance simultaneously.

Similarly, if the engine water temperature is equal to or greater than the first predetermined temperature (Yes in step S51), as well as if the running mode is the sport mode (Yes in step S54), and if the engine water temperature is less than a second predetermined temperature (where the second predetermined temperature>the first predetermined temperature) (No in step S55), the shutter grille controller 65 closes the shutter grille 63 while the radiator fan controller 10B operates the radiator fan 10A (in step S57B).

In other words, even in the case where the engine water temperature and the air conditioning coolant pressure are high, if the running mode is the sport mode and the engine water temperature is less than the second predetermined temperature, the shutter grille controller 65 and the radiator fan controller 10B perform the cooling by operating the radiator fan 10A with the shutter grille 63 closed. This makes it possible to achieve the aerodynamic performance and the cooling performance at the same time. This further makes it possible to prevent the engine 20 from being cooled too much, and to thereby achieve the warming performance simultaneously.

Similarly, if the engine water temperature is equal to or greater than the first predetermined temperature (Yes in step S51), and if the running mode is the sport mode (Yes in step S54), as well as if the engine water temperature is equal to or greater than the second predetermined temperature (Yes in step S55), and if the vehicle speed is equal to or greater than a predetermined speed (Yes in step S56), the shutter grille controller 65 closes the shutter grille 63 while the radiator fan controller 10B operates the radiator fan 10A (in step S57B).

In other words, even in the case where the engine water temperature and the air conditioning coolant pressure are high, if the running mode is the sport mode and the engine water temperature is equal to or greater than the second predetermined temperature, and further if the vehicle speed is equal to or greater than the predetermined speed, the shutter grille controller 65 and the radiator fan controller 10B perform the cooling by operating the radiator fan 10A with the shutter grille 63 closed. This makes it possible to achieve the aerodynamic performance and the cooling performance at the same time. This further makes it possible to prevent the engine 20 from being cooled too much, and to thereby achieve the warming performance simultaneously.

Furthermore, if the engine water temperature is less than the first predetermined temperature (No in step S51), and if the air conditioning coolant pressure is equal to or greater than the predetermined pressure (Yes in step S52), as well as if the predetermined length of time has passed since these conditions are satisfied (Yes in step S53), the shutter grille controller 65 opens the shutter grille 63 while the radiator fan controller 10B operates the radiator fan 10A (in step S57C).

Similarly, if the engine water temperature is equal to greater than the first predetermined temperature (Yes in step S51), and if the running mode is not the sport mode (No in step S54), the shutter grille controller 65 opens the shutter grille 63 while the radiator fan controller 10B operates the radiator fan 10A (in step S57C).

Similarly, if the engine water temperature is equal to greater than the first predetermined temperature (Yes in step S51), and if the running mode is the sport mode (Yes in step S54), as well as if the engine water temperature is equal to greater than the second predetermined temperature (Yes in step S55), and if the vehicle speed is less than the predetermined speed (No in step S56), the shutter grille controller 65 opens the shutter grille 63 while the radiator fan controller 10B operates the radiator fan 10A (in step S57C).

According to the fifth operation example, in the case where the engine water temperature is equal to or greater than the first predetermined temperature but less than the second predetermined temperature, if the running mode is the sport mode, the radiator fan 10A can be operated with the shutter grille 63 closed. The running performance and the cooling performance desired by the driver can be achieved at the same time.

Although the foregoing descriptions have been provided for the embodiment of the present invention, the present invention is not limited to the embodiment, and can be changed depending on the necessity within the scope not departing from the gist of the present invention.

For example, the first to fifth operation examples can be combined depending on the necessity.

Furthermore, the first to fifth operation examples may have a configuration which employs a power source load other than the engine water temperature.

Moreover, the third operation example may have a configuration which does not include step S33 or step S36B. In this case, if Yes in step S32, the flow proceeds to step S34. In addition, in steps S36A, S36C and S36D, the radiator fan 10A is controlled in the two steps: stop and operation.

Besides, the shutter grille controller 65 and the radiator fan controller 10B may be integrated into a single configuration using the same CPU, ROM, RAM, input/output circuits and so on.

What is claimed is:

1. A cooling system comprising:
a shutter grille provided to an air guide port configured to guide air to a power compartment in which a power source of a vehicle is installed;
a radiator configured to radiate heat from coolant for cooling the power source;
a radiator fan configured to send the air to the radiator and the power source;
a shutter grille controller configured to control opening and closing of the shutter grille; and
a radiator fan controller configured to control the radiator fan, wherein
if a power source load on the power source is less than predetermined power source load, and if an air conditioning load on an air conditioner is equal to or greater than predetermined air conditioning load, the shutter grille controller and the radiator fan controller operate the radiator fan with the shutter grille closed.

2. The cooling system according to claim 1, wherein
if a length of time for which the radiator fan is being operated with the shutter grille closed reaches a predetermined length of time, the shutter grille controller and the radiator fan controller open the shutter grille with the radiator fan kept operating.

3. The cooling system according to claim 1, wherein
if the radiator fan is being operated with the shutter grille closed, and if an operation amount of the air conditioner is equal to or greater than a predetermined operation amount, the shutter grille controller and the radiator fan controller open the shutter grille with the radiator fan kept operating.

4. The cooling system according to claim 1, wherein
if the air conditioner is out of operation, if the air conditioning load is equal to or greater than the predetermined air conditioning load, and if a charge level of a battery configured to supply electric power to the air conditioner is equal to or greater than a predetermined level, the shutter grille controller and the radiator fan controller operate the radiator fan with the shutter grille closed.

5. The cooling system according to claim 1, wherein
when a running mode of the vehicle is switched to a sport mode in a case where the power source load is less than a second predetermined power source load which is greater than the predetermined power source load, the shutter grille controller and the radiator fan controller operate the radiator fan with the shutter grille closed.

* * * * *